July 22, 1958     W. D. TRETHEWEY     2,844,159

FLOW DIVIDING VALVE

Filed April 12, 1956

INVENTOR.
WILLIAM D. TRETHEWEY
BY
*McGraw & Edwards*
ATTORNEYS

United States Patent Office 2,844,159
Patented July 22, 1958

2,844,159

FLOW DIVIDING VALVE

William D. Trethewey, Douglas, Wyo.

Application April 12, 1956, Serial No. 577,797

8 Claims. (Cl. 137—101)

This invention relates to improvements in flow-dividing valves, and more particularly to improvements to a valve arranged to accurately separate a stream of fluid into two predetermined fractions of the original stream.

This invention is an improvement of my co-pending application Serial No. 380,779 filed September 17, 1953, for Volume Control Valve, now U. S. Patent No. 2,760,510. In my co-pending application there is described a flow-dividing valve which utilizes a pivoted balance arm for balancing the impact pressure of a split stream of fluid so as to operate valves for dividing a stream of fluid into two predetermined fractions of the original stream. The valves described in my co-pending application efficiently perform their function of dividing a stream of fluid, but they require high precision in making the various parts, especially the moving parts, for the valve. Furthermore, the design of the valves makes manufacture and assembly difficult.

According to the present invention, I have discovered a simple valve which will accurately divide a stream of fluid into two predetermined fractions. The valve is economical to manufacture, very small in size, and highly efficient in operation. Due to the construction of the valve, only one moving part is used for performing the function of dividing a stream of fluid. Further, the simplicity of design permits the valve to be produced by economical mass production methods.

Included among the objects and advantages of the present invention is to provide a simplified and economical flow-dividing valve which accurately divides a single stream of fluid into two predetermined streams regardless of back pressure on either or both of the predetermined divided streams. The device provides a small, flow-dividing valve with a single moving part which operates to efficiently and effectively divide the flow of a single stream of fluid into two predetermined fractions regardless of the rate of flow of the single stream and regardless of variations in the rate flow of the single stream. The valve of the invention provides an economical device of a very simple design which is easy and economical to manufacture and assemble, and which is easy and economical to install in a system. The valve of the invention provides a device which may be used to provide two varying streams of fluid from a single stream by merely tilting the device to change the dividing characteristics of the valve. The valve may be made to effectively handle liquids or gases.

These and other objects and advantages of the system may be readily ascertained by referring to the following description and illustrations in which.

Figure 1:
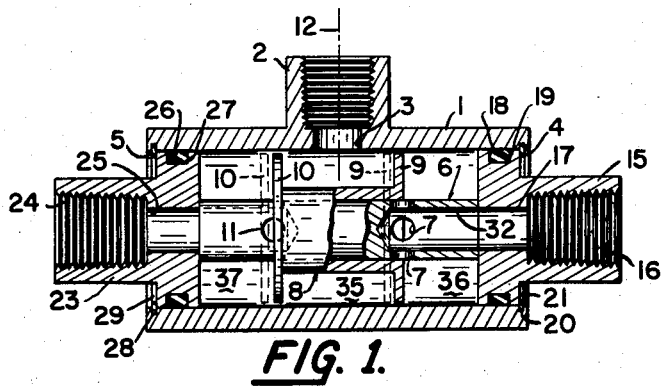
Fig. 1 is a partial sectional view of a flow-dividing valve according to the invention.
Figure 2:
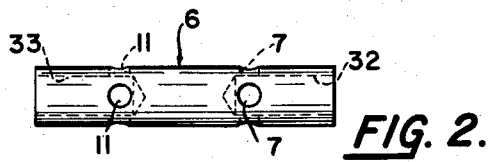
Fig. 2 is a detail elevational view of a slide rod according to the invention.

In the device selected for illustration in Fig. 1, the valve comprises a main tubular body 1 having a side inlet 2 which is threaded for attachment to a fluid line. The inlet 2 communicates with a passage 3, which is substantially centerwise of the body, communicating with the passage in the tubular body 1. The tubular body 1 has an open right end 4 and an open left end 5. A slide valve body or bar 6 is mounted longitudinally, and axially aligned in the passage of the body 1. The slide bar has a short passage 32 at one end and a short passage 33 at the opposite end; the two passages 32 and 33 being separate and not interconnected. The slide bar 6 is shown in detail in Fig. 2. A series of four holes 7 are extended through the wall into the passageway 32 at the right end thereof, and the holes 7 are so placed as to have their center lines substantially on a perpendicular plane to the longitudinal axis to the bar 6. A series of holes 11 are extended through the other end of the bar into the passageway 33, and the holes 11 are, likewise, so positioned that their centerline is substantially on a perpendicular plane to the longitudinal axis of the bar. Mounted on the bar is a reciprocable slide valve 8 having an upright portion 9 at one end thereof and an upright portion 10 at the opposite end thereof. The portions 9 and 10 are disc-like bodies or baffles with their peripheral extent spaced slightly from the inner wall of the tubular member 1 so as to provide a definite space or opening therebetween of known total area perpendicular to the body's axis. The area of the opening between the disc 9 and the inner wall 1 is equal to the area of the opening between disc 10 and the inner wall of the tubular member 1. The total cross sectional areas of the holes 7 and 11 are equal, and should equal the total area of the spaces between discs 9 and 10 and the wall of the body.

The slide valve 8 is mounted as a close, but freely reciprocal, fit on the slide bar 6. The length of the valve slide is such that one end closes one half of the holes 11 at the left end thereof and closes one half of the holes 7 at the right end thereof. When the valve slide is moved to completely close one set of openings, the other set of openings is completely open.

A plug 15 closes the right end 4 of the tube 1, and it includes a threaded outlet 16 communicating with a passageway 17. An O-ring seal 18 mounted in a groove 19 seals the plug in the inner end. A snap ring 21 is fitted in a groove 20 adjacent the end 4 and is arranged to hold the plug in position in the tube 1. In like manner, a plug 23 at the opposite end thereof is arranged to close the left end of the slide valve, and an O-ring seal 26 mounted in a groove 27 prevents leakage around the plug. A snap ring 29 mounted in a groove 28 holds the end in position in the valve. A threaded passage 24 in the plug is arranged for connection to a fluid line and interconnects with a passage 25. The bar 6 is mounted so that the passage 33 communicates with the passage 25 in the plug at the left end, and the passage 32 communicates with the passage 17 in the plug 15 at the opposite end thereof. By proportioning the parts correctly the fit may be such that there is substantially no leaking between the passages in the bar and the body. Various types of sealing members may, obviously, be used to seal the slide bar in the plugs.

Figure 4:
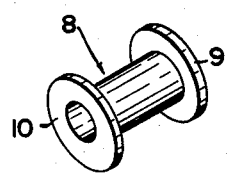
Fig. 4 is a perspective view of the slide mechanism of the valve shown in Fig. 1.

In operation of the device, the inlet 2 is connected to a line leading to a source of fluid. For purposes of illustration it may be assumed that the inlet 2 is connected with a hydraulic pump supplying a stream of hydraulic fluid. Further, for illustration, it may be assumed that the threaded outlet 16 is connected to a line leading to one hydraulic cylinder and the outlet 24 is interconnected with a line leading to a similar hydraulic cylinder. The hydraulic fluid which passes through the line into inlet 3 first passes into chamber 35, which is the space between the disc-like members 9 and 10. Since the spool shaped member 8, shown in Fig. 4, is substantially rigid, the volume of space 35 will remain constant. The fluid then passes around the discs, that is through the space between the periphery of the discs and the inner surface of the valve body, into the chambers at the ends of the valves. The fluid that passes around disc 9 enters the chamber 36 and the fluid that passes around disc 10 enters chamber 37.

With the valve slide 8 centered over the outlets and centered in relation to the inlet 3, and with no back pressure on outlets 16 and 24, fluid which enters the chamber 35 divides and impinges on the inner surface of the discs 9 and 10 with substantially the same force. Therefore, there is no tendency to move the slide in either direction, and the amount of fluid that passes over the discs into each chamber is equal. If a back pressure, however, is exerted on the passage 15, as for example by placing a heavy weight on the hydraulic cylinder to which the outlet 16 is connected, there is a decrease in the flow of fluid through the passage, due to the change in pressure difference, and therefore there must be a decrease in the flow of fluid around the disc 9 into the chamber 36. The flow from passage 3 is therefore greater into chamber 37 and it impinges on the disc 10 with more force than on disc 9, moving the slide to the left or toward the position indicated in the dashed lines 9 and 10. When the valve slide 8 moves to the left, however, it closes the openings 11 and simultaneously opens the openings 7 so that there is an automatic back pressure built up in chamber 37 which substantially compensates for the back pressure in 36, and, therefore, the flow of fluid will be resumed around the disc 9 through the outlets 7. Under these conditions the area of openings 7 is slightly larger than openings 11, due to the displacement of slide 8, but the amount of flow from each outlet 16 and 24 is equal due to difference in back pressure on each outlet. The movement of the slide, which partially closes one set of openings and further opens the other set of openings, automatically compensates the back pressure and permits an exactly equal flow of fluid out the passages 17 and 25. If the back pressure is decreased on passage 17, fluid entering the chamber 35 more readily passes into chamber 36 impinging with greater force on the disc 9, thereby moving the slide back to the right, partially closing the openings 7 and further opening the openings 11, tending, thereby, to continue to pass an exactly equal amount of fluid through each set of openings 7 and 11. The distance between the center line 12 of passage 3 and the discs determines the force of impingement on the discs.

In the example given above, it was assumed that the valve was interconnected with output line of a hydraulic pump which pumps hydraulic fluid. It is obvious, however, that the valve may be utilized with substantially any type of fluid flowing in a conduit or with any mechanism connected thereto.

Figure 3:
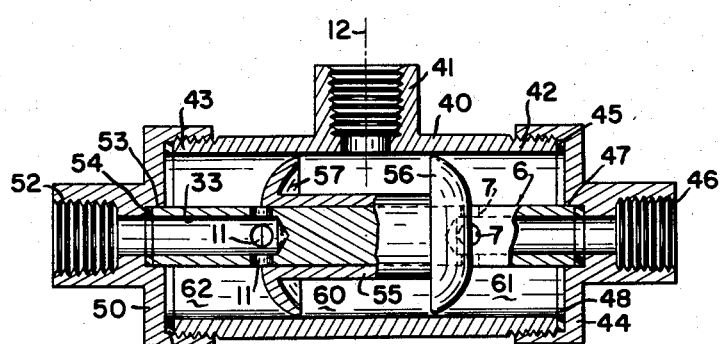
Fig. 3 is a side elevation in partial section showing a modified valve according to the invention.

The modified device illustrated in Fig. 3 is a similar type of flow-dividing valve except that it utilizes threaded, capped ends and a modified valve slide. In this modification, the valve body 40 has a threaded inlet 41 which communicates with the interior of the passage of the tubular body 40 and a threaded right end 42 and a threaded left end 43. A cap 44 threadedly engages the threaded end 42 and substantially closes same. The cap 44 includes a gasket 45 to prevent leaking between threaded outlet 46. A slide bar 6 is mounted in a recess 47 and a gasket 48 prevents leaking between the two members. A cap 50 closes the opposite end 43 and gasket 51 prevents leaking in a similar manner. A threaded outlet 52 provides means for connection of the valve to a fluid motor, and the adjacent end of the member 6 is positioned in a recess 53 and is sealed therein by a gasket 54. A valve slide which is mounted in a close fit on the bar 6 is reciprocally disposed thereon and includes a tubular body member 55, a right end, cup-shaped member 56 and a left end cup-shaped member 57. A clearance is provided between the peripheral surface of the cups and the inner surface of the tube so as to provide a passage for fluid around the cup-shaped members. The disc-shaped members substantially divide the interior of the valve 40 into three chambers including a constant volume, central chamber 60, a right end chamber 61 and left end chamber 62. The slide is proportioned so as to substantially close one-half of the openings 7 in the right end of the slide bar 6 and simultaneously close one-half of the openings 11 in the opposite end thereof. With this arrangement of Fig. 3, as the slide closes one set of openings it opens the other.

Operation of the modified valve is substantially the same as the operation of the valve of Fig. 1 in that fluid entering the inlet 41 is divided in the chamber 60, part going around the cup-shaped disc 56 and the remainder going around the member 57. In a like manner, a back pressure in either of the outlets 46 or 52 causes the slide to move, opening and closing respectively the openings into the various chambers and providing an exact dividing of the stream of fluid entering the valve.

In one application, by having the valve slide of heavy material, a difference in the amount of fluid delivered through each outlet may be obtained. In other words, the amount may be varied by merely tipping the valve from a horizontal position so that the weight of the slide, which must be balanced by the divided stream in the central chamber, is, therefore, a factor in the determination of the force on each of the disc or cup-shaped members. In a vertical position, the full weight of the slide member is directed against one of the chambers. Therefore, it will tend to provide a smaller opening through the lower outlets and a larger opening through upper outlets, so that a larger amount of fluid will be delivered from the upper outlet rather than the lower outlet. The valve is very sensitive and may be used as a motivating force for leveling means.

The outlets of the valve are controlled by a slide valve, and by providing a close fit very accurate control of the flow may be obtained with very little, if any, wear between the moving parts. Furthermore, since it is a slide-type valve, the high pressures of the fluid in certain applications have no effect on the operation of the valve. There are no seats for the valve slide to perpendicularly move and very little wear will occur, especially as the valve slide moves only a short distance. Also, since the valve slide will completely close one set of outlet openings without touching the adjacent end wall, there is no noise connected with the operation of the valve, and no parts will be worn by impact since the movement of the slide stops as soon as the outlet is completely closed.

While the device has been illustrated for use with hydraulic fluid, it will be obvious that it may be made to operate with any fluid and under substantially any pressure. The simplicity of the device makes it well suited for high-pressure hydraulic work, since it is most simply and effectively manufactured as a tubular device. Therefore, it is only necessary to vary the thickness of the wall of the device to obtain the strength desired. The device works extremely well under low pressure water, and by providing a light-weight slide the device works equally well under low or high pressure air to divide a flow of such fluid. Furthermore, by providing a valve with a very lightweight slide, the effect of gravity on the slide, when the bar 6 is turned out of the horizontal position, may be substantially negligible. This is especially true in high-pressure operations where a light weight valve slide will have very little effect on the change in the dividing characteristics of the valve. By changing the relative position of each of the baffle or upright members on the valve slide to the center line 12 of the valve inlet, the amount of fluid delivered from each outlet may be varied.

While the invention has been described by reference to specific embodiments, there is no intent to limit the scope or concept of the invention to the precise details so illustrated except insofar as set forth in the following claims.

I claim:

1. A flow-dividing valve for dividing a single stream of fluid into two predetermined streams comprising a tubular body having a single centerwise inlet in its side wall and two opposed outlets at the ends of said body, a cylindrical valve support axially mounted in said body, a spool-shaped valve slide reciprocally mounted on said valve support, port means inclusive of two series of small holes at opposed positions in said valve support, each series of holes being interconnected to a separate passageway in said support and interconnected with its adjacent outlet, said valve slide being arranged to simultaneously close one-half of each of said series of small holes whereby movement of said valve slide to fully close one series of small holes fully opens the opposite series of small holes, and baffle means mounted adjacent each end of said valve slide for effectively dividing said body into a central inlet chamber communicating with said centerwise inlet and a substantially separate outlet chamber communicating with each of said series of holes, an opening of substantially equal area around each said baffle means for fluid passage from said center inlet chamber to each of said outlet chambers.

2. A flow dividing valve according to claim 1 in which said baffle means are disc-like members.

3. A flow dividing valve according to claim 1 in which said baffle means are cup-shaped members.

4. A flow-dividing valve for dividing a single stream of fluid into two predetermined streams comprising a tubular body having a single centerwise inlet in its sidewall and two opposed outlets at the ends of said body, a cylindrical valve support mounted axially in said body, a spool-shaped valve slide reciprocally mounted on said valve support, port means in said valve support inclusive of two series of holes in said support equidistance from the axis of said inlet, each series of holes being interconnected to a separate passageway to each of said outlets, said valve slide being arranged to simultaneously close one-half the area of each of said series of holes whereby movement of said valve slide to fully close one series of holes fully opens the opposite series of holes, and baffle means mounted adjacent each end of said valve slide for effectively dividing said body into a central inlet chamber communicating with said centerwise inlet and a substantially separate outlet chamber communicating with each of said series of holes, said baffle means being circular and spaced from the wall of said tubular body providing an annular opening around each baffle means of substantially equal area for fluid passage from said cener inlet chamber to each of said outlet chambers.

5. A flow-dividing valve according to claim 4 in which the area of the opening between each baffle and the tubular body wall is substantially equal to the combined areas of the adjacent series of holes.

6. A flow-dividing valve according to claim 4 in which said port means includes a series of circular holes in said valve support arranged with their centers on a perpendicular plane through said valve support.

7. A flow-dividing valve according to claim 4 in which said baffle means are arranged equi-distant from the center of said centerwise inlet when said valve slide is closing one-half of each of said series of holes.

8. A flow-dividing valve according to claim 4 in which said baffles are spaced from the center of said centerwise inlet when said valve slide is closing one half the area of each said series of holes.

References Cited in the file of this patent

UNITED STATES PATENTS

| | | |
|---|---|---|
| 1,993,790 | Kinsella | Mar. 12, 1935 |
| 2,266,921 | Trautman | Dec. 23, 1941 |
| 2,643,664 | Willett | June 30, 1953 |
| 2,651,491 | Ashton et al. | Sept. 8, 1953 |
| 2,760,510 | Trethewey | Aug. 28, 1956 |